(12) United States Patent
Lin et al.

(10) Patent No.: US 12,156,545 B2
(45) Date of Patent: Dec. 3, 2024

(54) ELECTRONIC CIGARETTE HAVING POWER CHIP WITH AUTOMATIC CLOSED-LOOP CONTROL FOR OUTPUT

(71) Applicant: SHENZHEN HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: SHENZHEN HAPPY VAPING TECHNOLOGY LIMITED, Shenzhen (CN)

( * ) Notice: Subject to any disclaimer, the term of this patent is extended or adjusted under 35 U.S.C. 154(b) by 412 days.

(21) Appl. No.: 17/637,072

(22) PCT Filed: Aug. 12, 2020

(86) PCT No.: PCT/CN2020/108589
§ 371 (c)(1),
(2) Date: Feb. 21, 2022

(87) PCT Pub. No.: WO2021/057297
PCT Pub. Date: Apr. 1, 2021

(65) Prior Publication Data
US 2022/0287373 A1    Sep. 15, 2022

(30) Foreign Application Priority Data
Sep. 25, 2019   (CN) .......................... 201910912835.7

(51) Int. Cl.
*A24F 40/50* (2020.01)
*A24F 40/10* (2020.01)
(Continued)

(52) U.S. Cl.
CPC .............. *A24F 40/50* (2020.01); *A24F 40/10* (2020.01); *A24F 40/60* (2020.01); *H02M 3/157* (2013.01); *H02M 3/1582* (2013.01); *H02M 1/32* (2013.01)

(58) Field of Classification Search
CPC .......... A24F 40/10; A24F 40/50; A24F 40/53; A24F 40/60; H05B 1/0227; H02M 3/003;
(Continued)

(56) References Cited

U.S. PATENT DOCUMENTS

2016/0294446 A1* 10/2016 Rumler .................... F24F 11/81
2019/0373679 A1* 12/2019 Fu ..................... A61M 15/0028

FOREIGN PATENT DOCUMENTS

CN   105955094 A  *  9/2016
CN   106998808 A     8/2017
(Continued)

OTHER PUBLICATIONS

International Search Report of PCT Patent Application No. PCT/CN2020/108589 issued on Nov. 16, 2020.

*Primary Examiner* — Jean F Duverne (57) ABSTRACT

The electronic cigarette having a power chip with automatic closed-loop control for output comprises a vaporizer and a battery assembly which are connected with each other. The vaporizer comprises a heating element. The battery assembly comprises a battery and a control circuit board arranged with a control circuit. The control circuit comprises a microcontroller, and comprises a power chip, a microcontroller power supply unit, and a starting switch, which are electrically connected with the microcontroller, respectively. The control circuit is further arranged with a reference resistor connected with the heating element. The power chip is electrically connected with the battery, the reference resistor, and the heating element. The power chip is configured to perform automatic closed-loop control by determin-
(Continued)

ing the resistance value of the reference resistor and feedback for output voltage under a command of the microcontroller, to output precisely adjustable voltage to the heating element.

15 Claims, 4 Drawing Sheets

(51) Int. Cl.
*A24F 40/60* (2020.01)
*H02M 1/32* (2007.01)
*H02M 3/157* (2006.01)
*H02M 3/158* (2006.01)

(58) Field of Classification Search
CPC ...... H02M 1/32; H02M 3/1582; H02M 3/157; G05B 19/0423
See application file for complete search history.

(56) References Cited

FOREIGN PATENT DOCUMENTS

| | | | |
|---|---|---|---|
| CN | 107404107 | A | 11/2017 |
| CN | 109805451 | A | 5/2019 |
| CN | 110074465 | A | 8/2019 |
| CN | 210929648 | U | 7/2020 |

\* cited by examiner

ELECTRONIC CIGARETTE HAVING POWER CHIP WITH AUTOMATIC CLOSED-LOOP CONTROL FOR OUTPUT

TECHNICAL FIELD

The disclosure relates to the field of electronic cigarettes, more particularly to an electronic cigarette having a power chip with automatic closed-loop control for output.

BACKGROUND

Existing electronic cigarettes usually heat and vaporize the electronic cigarette liquid by means of the vaporizer, to produce vapor for the smoker. Since the electronic cigarette liquid does not contain the tobacco tar, the harm to the human body is reduced. Thus, the electronic cigarettes are widely used and gradually replace tobacco cigarettes.

The power supplies of existing electronic cigarettes are internal batteries. Initially, the battery of an electronic cigarette has higher output voltage, which may result in too much vapor to be produced during using. As service time passes, the electric quantity of the battery will gradually decrease and the output voltage of the battery will keep decreasing, the amount of produced vapor will be greatly reduced then. In addition, since the heating resistor for vaporizing the electronic cigarette liquid has a resistance value which changes as the vaporizing temperature changes, the operating power of the heating resistor keeps changing as well. Consequently, during using, the amount of produced vapor is very unstable on different conditions of the battery at different vaporizing temperatures. To this end, it is desired to provide a buck-boost circuit to achieve stable output control for supply voltage, and further adjust output voltage in real-time based on a change of the resistance value of the heating resistor to achieve stable output power for producing constant amount of vapor.

Existing electronic cigarettes usually provide output voltage for the heating element by using the pulse width modulation PWM, which changes the frequency and magnitude of output voltage by adjusting the duty ratio. However, when the battery voltage is lower than the required output voltage, it is impossible to provide the required output voltage. Further, the full bridge buck-boost circuit, which is applied in other fields, has a complicated structure and too big size to be mounted in the compact electronic cigarettes. It does not have any circuit for accurately controlling output voltage and stable output power and thus have very unstable performance. Besides, it has a high cost.

Existing electronic cigarettes do not have a power chip capable of managing power output, in particular a power chip for achieving step-up/down power voltage, stable and adjustable output voltage and constant output power. Existing electronic cigarette chips, either those merely having a current path for controlling the heating coil by a single switch transistor, or those merely having constant voltage output control, cannot achieve adjustable output voltage and constant power, and thus cannot meet actual requirements as mentioned above.

SUMMARY

Technical Problem

An object of the disclosure is to overcome the above deficiencies and provide an electronic cigarette having a power chip with automatic closed-loop control for output. The electronic cigarette having a power chip with automatic closed-loop control for output can achieve stable and precisely adjustable output voltage and stable output power by automatic closed-loop control.

Technical Solutions

The disclosure provides a technical solution as follow. The electronic cigarette having a power chip with automatic closed-loop control for output comprises a vaporizer and a battery assembly which are connected with each other. Herein, the vaporizer comprises a heating element for heating and vaporizing cigarette liquid. The battery assembly comprises a battery and a control circuit board, wherein the control circuit board is arranged with a control circuit. The control circuit comprises a microcontroller, and comprises a power chip with automatic closed-loop control for output, a microcontroller power supply unit, and a starting switch, which are respectively electrically connected with the microcontroller. The control circuit is further arranged with a reference resistor connected with the heating element. The power chip is electrically connected with the battery, the reference resistor, and the heating element. The power chip is configured to perform automatic closed-loop control by determining the resistance value of the heating element and feedback signal for output voltage under a command of the microcontroller, to provide precisely adjustable output voltage to the heating element, and enable the heating element to produce constant amount of vapor.

Preferably, the power chip may comprise a built-in MCU module, a full bridge buck-boost module, an output voltage feedback circuit module, an internal power module, an operational amplifying unit module, and several signal terminals. Herein, the full bridge buck-boost module may comprise four N-channel MOS transistors and four PWM driving logic circuits. The built-in MCU module may be connected with and configured to control the four PWM driving logic circuits, and the four PWM driving logic circuits may be respectively connected with and configured to control the four N-channel MOS transistors. Herein, the first PWM driving logic circuit may be further connected with a signal terminal BOOT1 and a signal terminal SW1, and the fourth PWM driving logic circuit may be further connected with a signal terminal BOOT2 and a signal terminal SW2. The first N-channel MOS transistor may be electrically connected with the second N-channel MOS transistor, the fourth N-channel MOS transistor may be electrically connected with the third N-channel MOS transistor, the first N-channel MOS transistor may be further connected with an external input voltage terminal, i.e., a signal terminal VIN, and the fourth N-channel MOS transistor may be further connected with a signal terminal VOUT. The signal terminal VOUT may serve to provide output voltage to the heating element of the electronic cigarette. The second PWM driving logic circuit, the second N-channel MOS transistor, the third N-channel MOS transistor and the third PWM driving logic circuit may be respectively arranged with a port connected with the grounding terminal PGND. The output voltage feedback circuit module may be configured to feed the output voltage of the signal terminal VOUT back to the built-in MCU module. The internal power module may be configured to step up the input voltage of the signal terminal VIN and then supply power to the four PWM driving logic circuits. The operational amplifying unit module may be configured to detect a resistance value of the heating element, generate a differential analog signal by amplification operation and send it to the built-in MCU module. The built-in MCU module may be configured to generate a resistance signal by operations and send it to the microcontroller. The built-in MCU module may perform operations with a high degree of accuracy based on setting signals of the microcontroller and feedback signals of the output voltage feedback circuit module, and automatically control the full bridge buck-boost module, to provide precisely adjustable output voltage by the signal terminal VOUT.

Preferably, the power chip may further comprise a power supply signal terminal VDD, a grounding signal terminal GND, a data communication signal terminal SDA, a communication clock signal terminal SCL, and an enable signal terminal EN, which are connected with the built-in MCU module. Herein, the data communication signal terminal SDA may serve for interactive data communication between the microcontroller MCU and the built-in MCU module. The setting signals of the microcontroller which may comprise a signal of the setting value of the output voltage, may be sent to the built-in MCU module through the data communication signal terminal SDA and the communication clock signal terminal SCL. The enable signal terminal EN may serve to input activation signal to activate the built-in MCU module. The built-in MCU module may be in a sleep state before it is activated, such that the output voltage of the signal terminal VOUT is zero.

Preferably, the signal of the setting value of the output voltage may be generated by means of the microcontroller by a calculation based on the resistance signal.

Preferably, the built-in MCU module may comprise a PID controller which is configured to perform proportional control, integral control, and differential control for the full bridge buck-boost module, to provide accurate adjustable output voltage.

Preferably, the built-in MCU module may comprise an AD analog-to-digital conversion unit which is configured to convert the analog signal into the digital signal to achieve high precision control. The bits of the AD analog-to-digital conversion unit may be greater than 12.

Preferably, the power chip may further comprise a signal terminal IN+ and a signal terminal IN− which are connected with the operational amplifying unit module. Herein, the signal terminal IN+ may be connected with the signal terminal VOUT, the signal terminal IN− may be connected with one end of the heating element, and a resistor may be connected in series between the signal terminal IN+ and the signal terminal IN−.

Preferably, an inductor may be connected in series between the signal terminal SW1 and the signal terminal SW2, a first capacitor may be connected in series between the signal terminal SW1 and the signal terminal BOOT1, and a second capacitor may be connected in series between the signal terminal SW2 and the signal terminal BOOT2.

Preferably, the signal terminal VIN may have an input voltage in a range of 2.5V-12V, and the signal terminal VOUT may have an output voltage in a range of 0V-18V.

Preferably, the power chip may further comprise an internal circuit protection module electrically connected with the built-in MCU module, to provide overvoltage protection, under-voltage protection, overcurrent protection, and over-temperature protection, for internal circuits of the chip.

Preferably, the control circuit may further comprise an energy calculating unit and an energy and vaporizing amount conversion unit which are connected with the microcontroller MCU, and comprise an air flow sensor for detecting air flow. The energy calculating unit may comprise a power calculating unit and a timer for counting a time period in which the air flow sensor works. The energy and vaporizing amount conversion unit may be configured to convert the energy calculated by the energy calculating unit into a vapor amount or a consumption amount of cigarette liquid.

Preferably, the control circuit may be arranged with an alarm unit for warning the user, and the microcontroller may be preset with a limit value of the vapor amount or the consumption amount of the cigarette liquid. The microcontroller may be configured to control the power chip to stop output voltage, or control the alarm unit to send a warning signal, or control the power chip to stop output voltage and meanwhile control the alarm unit to send a warning signal, when the vapor amount or the consumption amount of the cigarette liquid calculated by the energy and vaporizing amount conversion unit exceeds the limit value.

Preferably, the timer may be configured to perform the timing including a timing of single puff and a total timing of a certain time. The limit value may include a limit value of single puff and a limit value in a certain time. The microcontroller may be configured to control the power chip to stop output voltage, or control the alarm unit to send a warning signal, or control the power chip to stop output voltage and meanwhile control the alarm unit to send a warning signal, when the vapor amount or the consumption amount of the cigarette liquid calculated by the energy and vaporizing amount conversion unit exceeds the limit value of single puff or the limit value in a certain time.

Preferably, the alarm unit may comprise an audible alarm, an LED light alarm, or a vibration alarm.

Preferably, the control circuit may further comprise a battery detection unit, a battery charging unit, and a battery protection unit, which are respectively electrically connected with the battery.

Preferably, the control circuit may further comprise a display unit arranged on a surface of the electronic cigarette, to display relative parameter information and alarm information of the electronic cigarette.

Advantages

The electronic cigarette having a power chip with automatic closed-loop control for output uses the power chip comprising the built-in MCU module arranged with high precision AD and the output voltage feedback circuit module. Further, the built-in MCU module is arranged therein with the PID controller for adjusting the full bridge buck-boost module to achieve stepping up and stepping down and achieve PID automatic control with high precision for output voltage. In addition, it is arranged therein with the high precision operational amplifying unit for precisely detecting the resistance value of the heating element. Based on the resistance value of the heating element, the built-in MCU module can achieve adjustable output voltage of various values, achieve constant output power, and thus achieve stable vaporizing amount during the operation of the electronic cigarette. The power chip is arranged therein with the internal circuit protection module to provide automatic overvoltage protection, under-voltage protection, overcurrent protection, short-circuit protection, over-temperature protection, and the like. Due to the enable signal terminal EN arranged therein, the chip is in a sleep state which saves power and achieves low power consumption when the enable signal terminal EN does not receive the activation signal. The chip achieves automatic EMI anti-interference adjustment. In addition, the power chip achieves a high integration, such that external components and member are greatly reduced. It has high work efficiency, with less amount of heat being generated. Due to the small size, the chip can be very easily mounted inside the electronic cigarette which has very small space. Further, due to the power chip which can provide stable output voltage or constant power, the electronic cigarette of the disclosure can calculate the heating energy based on the total smoking time, and then calculate the vaporizing amount or the consumption amount of the cigarette liquid in a certain time period of smoking based on the one-to-one correspondence relationship between the heating energy and the vaporizing amount of the electronic cigarette or the consumption amount of the cigarette liquid, thereby managing and controlling the vaporizing amount or the consumption amount during smoking.

DETAILED DESCRIPTION OF ILLUSTRATED EMBODIMENTS

Figure 1:
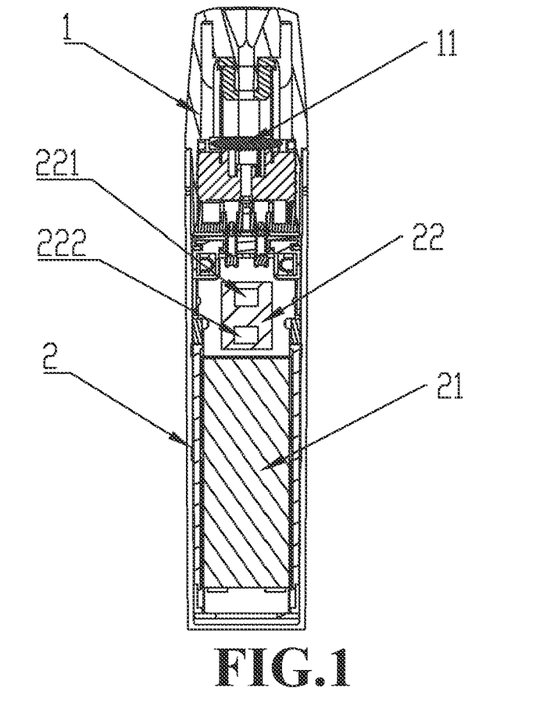
FIG. 1 is a cross-sectional view of an electronic cigarette according to an embodiment of the disclosure.

Referring to FIG. 1, the disclosure provides an electronic cigarette having a power chip with automatic closed-loop control for output, which comprises a vaporizer 1 and a battery assembly 2 which are connected with each other. Herein, the vaporizer 1 comprises a heating element 11 for heating and vaporizing electronic cigarette liquid. The battery assembly 2 comprises a battery 21 and a control circuit board 22, wherein the control circuit board 22 is arranged with a control circuit (not shown in the drawings). The control circuit comprises a microcontroller 221, and comprises a power chip 222 with automatic closed-loop control for output, a microcontroller power supply unit, and a starting switch (not shown in the drawings), which are electrically connected with the microcontroller 221, respectively. The microcontroller power supply unit serves to provide power supply transformation for the microcontroller. The starting switch comprises an automatic microphone switch or a manually operated button switch. When the starting switch is turned on, the electronic cigarette enters a standby state to prepare for producing vapor.

Figure 2:
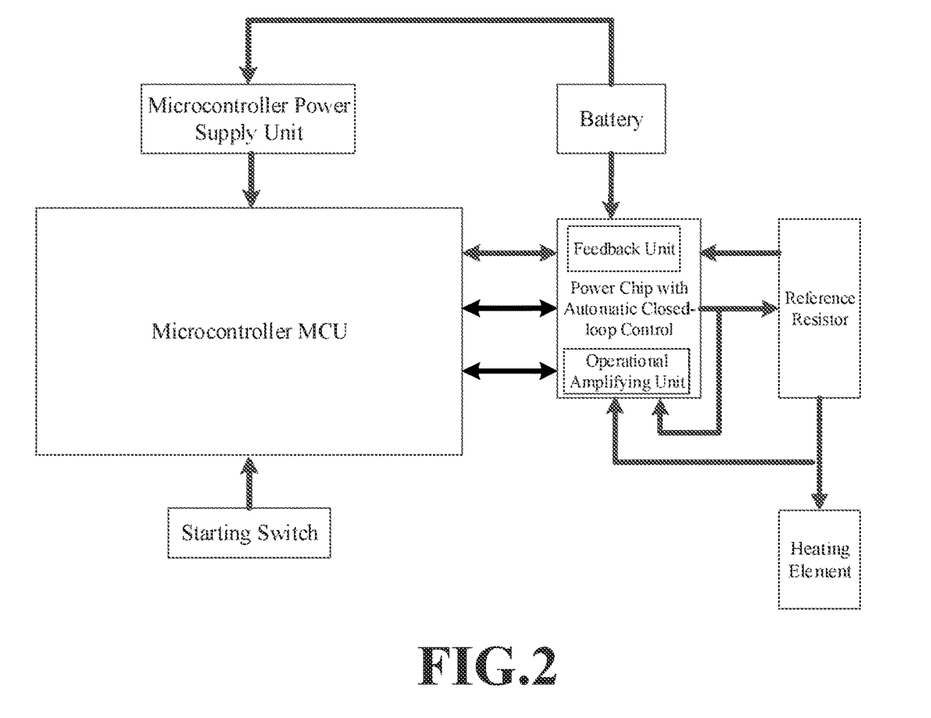
FIG. 2 is a structural view illustrating a control circuit of an electronic cigarette according to an embodiment of the disclosure.

Referring to FIG. 2, the control circuit comprises the microcontroller MCU, and comprises the power chip with automatic closed-loop control for output, which is electrically connected with the microcontroller MCU. The control circuit is further arranged with a reference resistor connected with the heating element. The power chip is electrically connected with the battery, the reference resistor, and the heating element. The power chip is configured to determine, under a command of the microcontroller MCU, the resistance value of the heating element by detecting the reference resistance, determine feedback signal for output voltage, perform automatic closed-loop control, to output precisely adjustable voltage to the heating element, and enable the heating element to produce constant amount of vapor.

Figure 3:
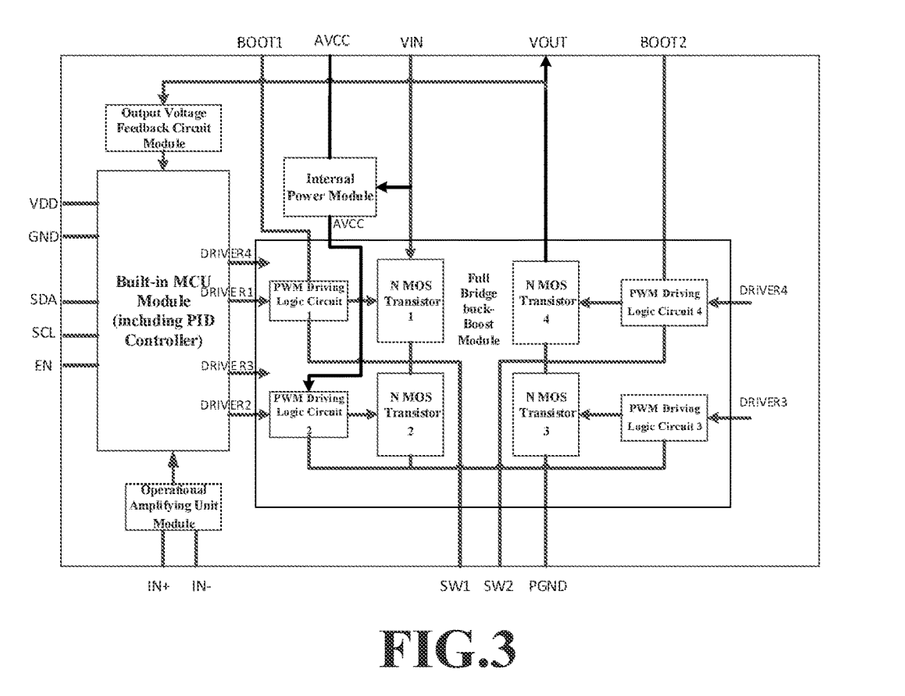
FIG. 3 is a view illustrating an internal circuit configuration of a power chip of an electronic cigarette according to an embodiment of the disclosure.

Referring to FIG. 3, the power chip with automatic closed-loop control for output of the electronic cigarette according to the disclosure comprises a built-in MCU module, i.e., the microcontroller calculation module built in the chip, a full bridge buck-boost module, an output voltage feedback circuit module, an internal power module, an operational amplifying unit module, and several signal terminals, i.e., pins of the chip. The full bridge buck-boost module comprises four N-channel MOS transistors (N MOS transistor 1, N MOS transistor 2, N MOS transistor 3, N MOS transistor 4) and four PWM driving logic circuits (PWM driving logic circuit 1, PWM driving logic circuit 2, PWM driving logic circuit 3, PWM driving logic circuit 4). The built-in MCU module is connected with and configured to control the four PWM driving logic circuits respectively by four circuits DRIVER1, DRIVER2, DRIVER3, and DRIVER4. The four PWM driving logic circuits are respectively connected with the four N-channel MOS transistors and configured to control the four N-channel MOS transistors. Herein, the first PWM driving logic circuit (PWM driving logic circuit 1) is further connected with the signal terminal BOOT1 and the signal terminal SW1. The fourth PWM driving logic circuit (PWM driving logic circuit 4) is further connected with the signal terminal BOOT2 and the signal terminal SW2. The first N-channel MOS transistor (N MOS transistor 1) is electrically connected with the second N-channel MOS transistor (N MOS transistor 2). The fourth N-channel MOS transistor (N MOS transistor 4) is electrically connected with the third N-channel MOS transistor (N MOS transistor 3). The first N-channel MOS transistor (N MOS transistor 1) is further connected with an external input voltage terminal, i.e., the signal terminal VIN. The fourth N-channel MOS transistor (N MOS transistor 4) is further connected with an external output voltage terminal, i.e., the signal terminal VOUT. The signal terminal VOUT serves to provide output voltage to the heating element of the electronic cigarette. The heating element is a heating resistor having a resistance value. The second PWM driving logic circuit (PWM driving logic circuit 2), the second N-channel MOS transistor, the third N-channel MOS transistor and the third PWM driving logic circuit (PWM driving logic circuit 3) are respectively arranged with a port connected with the grounding terminal PGND. The output voltage feedback circuit module is configured to feed the output voltage of the signal terminal VOUT back to the built-in MCU module.

The internal power module is configured to step up the input voltage of the signal terminal VIN and then supply power to the four PWM driving logic circuits by the signal terminal AVCC. The operational amplifying unit module is configured to detect the resistance value of the heating element, generate a differential analog signal by amplification operation and send it to the built-in MCU module. The built-in MCU module is configured to generate a resistance signal by operations and send it to the microcontroller. The built-in MCU module performs operations with a high degree of accuracy based on setting signals of the microcontroller and feedback signals of the output voltage feedback circuit module, and automatically controls the full bridge buck-boost module, to provide precisely adjustable and stable output voltage by the signal terminal VOUT. Further, the output voltage may be automatically adjusted based on setting signals of the microcontroller, and may be adjusted to a linear voltage of different values.

Referring to FIG. 3, the power chip with automatic closed-loop control for output of the electronic cigarette according to the disclosure further comprises a power supply signal terminal VDD, a grounding signal terminal GND, a data communication signal terminal SDA, a communication clock signal terminal SCL, and an enable signal terminal EN, which are connected with the built-in MCU module. Herein, the power supply signal terminal VDD serves to supply power for the built-in MCU module. The data communication signal terminal SDA serves for data communication between the microcontroller MCU and the built-in MCU module. The enable signal terminal EN serves to input activation signal to activate the built-in MCU module. The built-in MCU module is in a sleep state before it is activated, such that the output voltage of the signal terminal VOUT is zero. The signal of the setting value of the output voltage is generated by calculations based on the signals of resistance values and preset power values and the like by means of the microcontroller.

Referring to FIG. 3, the built-in MCU module comprises a PID controller. The PID controller may achieve proportional control, integral control, and differential control for the full bridge buck-boost module, to provide accurate and stable output voltage.

The built-in MCU module comprises an AD analog-to-digital conversion unit. The AD analog-to-digital conversion unit may convert the analog signal into the digital signal to achieve high precision control. The bits of the AD analog-to-digital conversion unit may be greater than 12.

Figure 4:
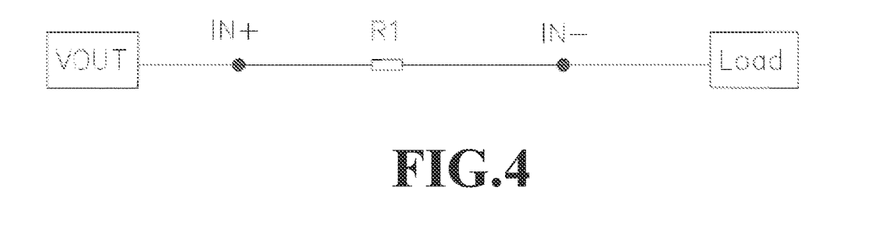
FIG. 4 is a circuit diagram illustrating a signal terminal IN+ and a signal terminal IN− of a power chip of an electronic cigarette according to an embodiment of the disclosure.

Referring to FIGS. 3 and 4, the electronic cigarette having a power chip with automatic closed-loop control for output according to the disclosure further comprises the signal terminal IN+ and the signal terminal IN− which are connected with the operational amplifying unit module. The signal terminal IN+ is connected with the signal terminal VOUT. The signal terminal IN− is connected with one end of the heating element Load. The reference resistor R1 is connected in series between the signal terminal IN+ and the signal terminal IN−. The operational amplifying unit module has precise amplification operation function and may achieve accurate detection for the resistance value of the heating element.

Figure 5:
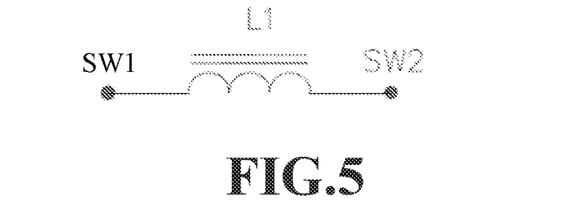
FIG. 5 is a circuit diagram illustrating a signal terminal SW1 and a signal terminal SW2 of a power chip of an electronic cigarette according to an embodiment of the disclosure.
Figure 6:
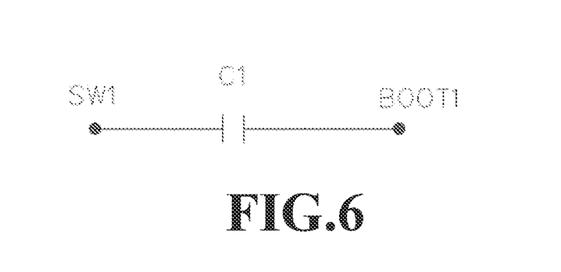
FIG. 6 is a circuit diagram illustrating a signal terminal SW1 and a signal terminal BOOT1 of a power chip of an electronic cigarette according to an embodiment of the disclosure.
Figure 7:
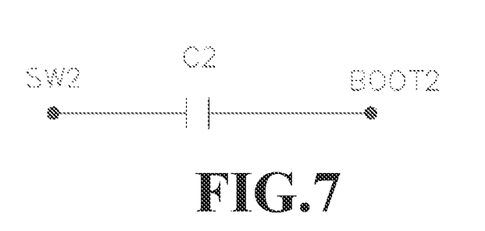
FIG. 7 is a circuit diagram illustrating a signal terminal SW2 and a signal terminal BOOT2 of a power chip of an electronic cigarette according to an embodiment of the disclosure.

Referring to FIGS. 5, 6 and 7, in the power chip with automatic closed-loop control for output of the electronic cigarette according to the disclosure, the inductor L1 is connected in series between the signal terminal SW1 and the signal terminal SW2. The inductor L1 serves to store and release energy to cooperate with the circuits of the full bridge buck-boost module to achieve stepping up and stepping down. The first capacitor C1 is connected in series between the signal terminal SW1 and the signal terminal BOOT1. The second capacitor C2 is connected in series between the signal terminal SW2 and the signal terminal BOOT2. The capacitors C1 and C2 serve to provide EMI electromagnetic filtering and provide shielding from electromagnetic interference. Hence, the chip may easily achieve automatic EMI anti-interference adjustment.

Referring to FIGS. 2 and 3, the power chip with automatic closed-loop control for output of the electronic cigarette according to the disclosure has main working principle as follows. When the chip is not required to work, the enable signal terminal EN does not have any input of activation signal, and the built-in MCU module does not work. At this moment, the signal terminal VOUT does not have any output. The chip is in the sleep state, which saves power and achieves low power consumption. When the chip is required to work, the microcontroller MCU inputs the activation signal through the enable signal terminal EN, such that the built-in MCU module starts to work. In such a case, the signal terminal SDA performs two-way data signal transmission. The built-in MCU module receives new setting value of the output voltage from the microcontroller MCU. The PID controller performs sequential control for the four PWM driving logic circuits. The four PWM driving logic circuits respectively controls the four N-channel MOS transistors and converts the input voltage of the signal terminal VIN to the output voltage. The output voltage feedback circuit module feeds the output voltage signal back to the built-in MCU module. After the PID controller performs proportional control, integral control, and differential control, the precise stable output voltage can be provided. The output voltage is output to the heating element of the electronic cigarette through the signal terminal VOUT, such that the heating element of the electronic cigarette can work at stable and adjustable voltage.

The above chip has the function of providing precise stable output voltage and can be applied to provide constant voltage. It also can adjust output voltage based on a change of the resistance value of the heating element, to ensure constant power of the heating element.

The operational amplifying unit, as shown in FIG. 3, detects the resistance value R of the heating element of the electronic cigarette from the signal terminal IN+ and the signal terminal IN−, processes and converts the signal of the detected resistance value R, and sends it to the built-in MCU module. Then, the built-in MCU module sends it to the microcontroller MCU. When the heating element of the electronic cigarette works, the conversion process of vaporizing the electronic cigarette liquid into vapor needs energy. In such a case, the amount of vapor to be produced depends on the power. The greater the power, the greater the amount of vapor, and vice versa. When the heating element of the electronic cigarette works at high temperature, the resistance value R may change. As the heating element's power $P=U^2/R$, the power will be changed when the resistance value R is changed while the voltage U is not changed. To make sure the amount of vapor produced by the heating element of the electronic cigarette keeps stable, it is necessary to keep the power unchanged. To keep the power unchanged, it is necessary to adjust the output voltage U. According to the principle, the microcontroller MCU calculates the new setting value U of the output voltage based on the resistance value R detected in real time, and sends it to the built-in MCU module through the signal terminal SDA. The built-in MCU module adjusts the full bridge buck-boost module by means of the PID controller, such that new output voltage U can be output through the signal terminal VOUT to keep the power P unchanged and keep the amount of vapor stable.

Referring to FIG. 3, the signal terminal VIN of the power chip of the electronic cigarette according to the disclosure preferably has an input voltage in a range of 2.5V-12V, the signal terminal VOUT preferably has an output voltage in a range of 0V-18V, and preferably has an output current in a range of 0 A-8 A.

Figure 8:
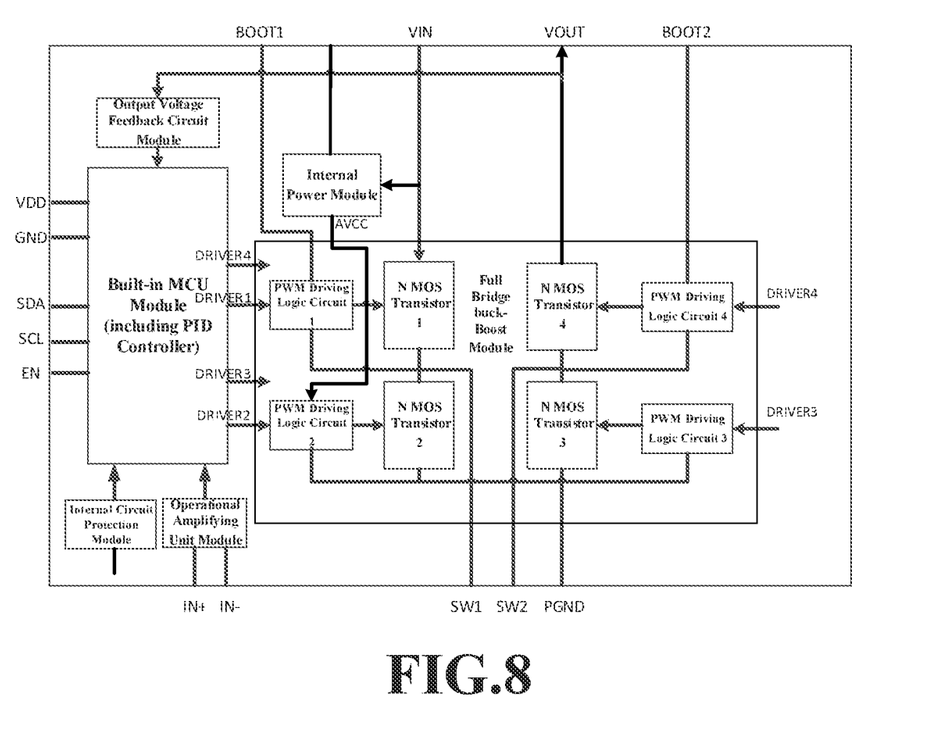
FIG. 8 is a view illustrating an internal circuit configuration of a power chip of an electronic cigarette according to another embodiment of the disclosure.

Referring to FIG. 8, the power chip according to another embodiment of the disclosure further comprises an internal circuit protection module electrically connected with the built-in MCU module, to provide overvoltage protection, under-voltage protection, overcurrent protection, short-circuit protection, over-temperature protection, and the like, for internal circuits of the chip, and prevent chip damage.

The power chip of the electronic cigarette according to the disclosure has tiny internal components and achieves a high integration, such that external components and member are greatly reduced. It has high work efficiency, with less amount of heat being generated. Due to the small size, the chip can be very easily mounted inside the electronic cigarette which has very small space.

Figure 9:
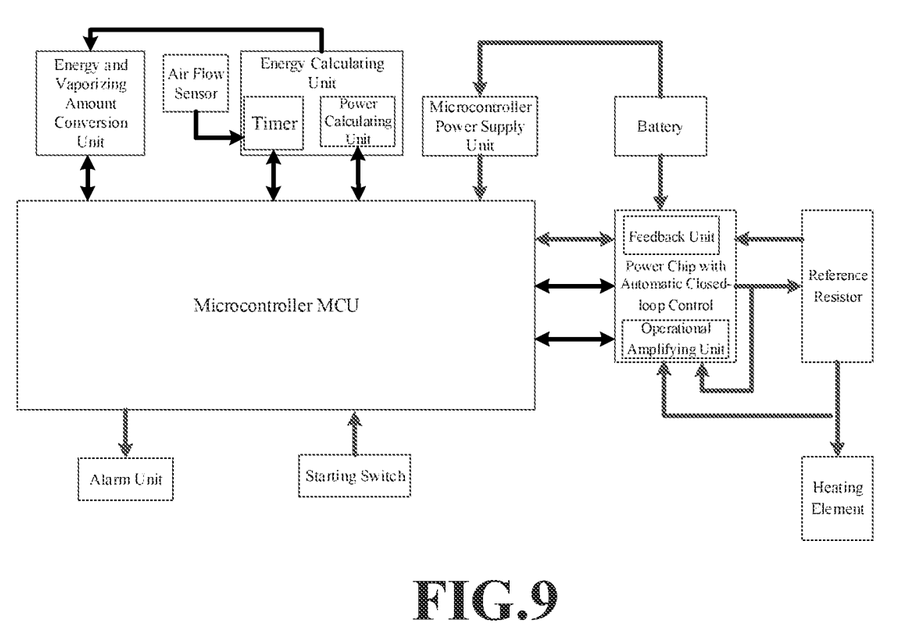
FIG. 9 is a structural view illustrating a control circuit of an electronic cigarette according to another embodiment of the disclosure.

Referring to FIG. 9, the control circuit further comprises the energy calculating unit and the energy and vaporizing amount conversion unit which are connected with the microcontroller MCU, and comprises the air flow sensor (not shown in the drawings) for detecting air flow. When the user smokes, air flow is generated in the electronic cigarette, and the time period in which the air flow is detected by the air flow sensor is the time period in which the user smokes.

The energy calculating unit comprises the power calculating unit and the timer for counting the time period in which the air flow sensor works. Based on the output voltage U of the voltage chip and the resistance value R of the heating element, the power calculating unit can calculate the heating element's power $P=U^2/R$. By multiplying the power P by the smoking time period, the energy calculating unit can calculate the power consumption or the heating energy for the heating of the heating element. As there is a one-to-one correspondence relationship (which in practical can be calculated by modeling) between the heating energy and the vaporizing amount of the electronic cigarette or the consumption amount of the cigarette liquid, the vaporizing amount or the consumption amount of the cigarette liquid in a certain time period of smoking can be calculated when the output power is constant. Hence, the energy and vaporizing amount conversion unit can convert the energy calculated by the energy calculating unit into the vapor amount or the consumption amount of the cigarette liquid.

The energy calculating unit, the power calculating unit, the timer, and the energy and vaporizing amount conversion unit, as mentioned above, can be disposed inside the microcontroller.

Referring to FIGS. 3 and 9, the control circuit is further arranged with the alarm unit for warning the user, and the microcontroller is preset with a limit value of the vapor amount or the consumption amount of the cigarette liquid. When the vapor amount or the consumption amount of the cigarette liquid calculated by the energy and vaporizing amount conversion unit exceeds the limit value, the microcontroller MCU controls the power chip to stop output voltage, or controls the alarm unit to send a warning signal, or both. The alarm unit may comprise an audible alarm, an LED light alarm, or a vibration alarm.

The process that the microcontroller MCU controls the power chip to stop output voltage can be achieved by the enable signal terminal EN of the power chip. When the microcontroller MCU stops sending the activation signal to the enable signal terminal EN of the power chip, it can enable the power chip to stop output voltage of the signal terminal VOUT, or enable the alarm unit to send the warning signal, or both.

The timer as mentioned above can perform the timing including a timing of single puff and a total timing of a certain time. The limit value may include a limit value of single puff and a limit value in a certain time. When the vapor amount or the consumption amount of the cigarette liquid calculated by the energy and vaporizing amount conversion unit exceeds the limit value of single puff or the limit value in a certain time, the microcontroller MCU can control the power chip to stop output voltage.

Figure 10:
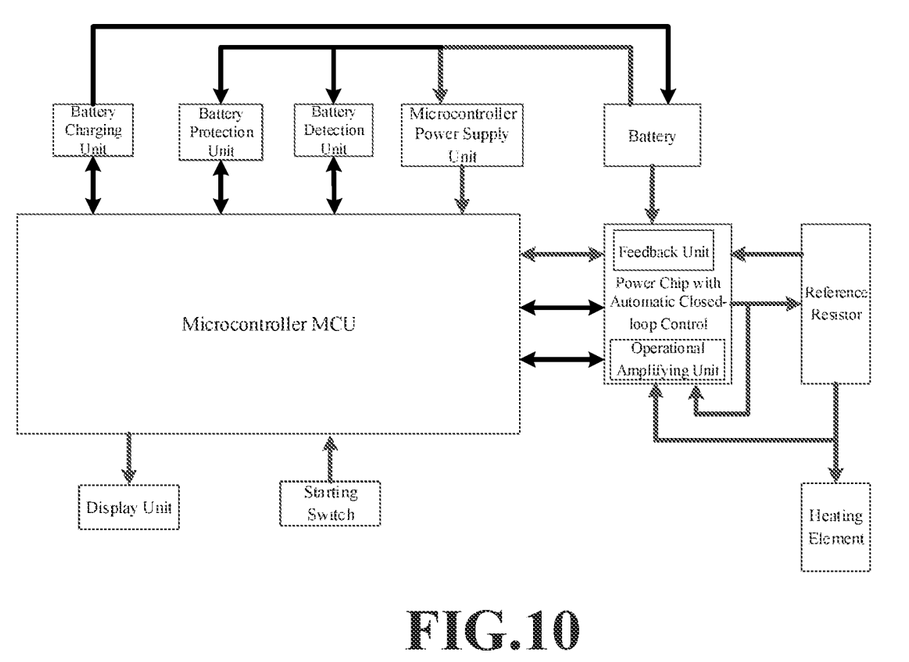
FIG. 10 is a structural view illustrating a control circuit of an electronic cigarette according to another one embodiment of the disclosure.

Referring to FIG. 10, the control circuit further comprises the battery detection unit, the battery charging unit, and the battery protection unit, which are respectively electrically connected with the battery. The control circuit further comprises the display unit which is arranged on the surface of the electronic cigarette, to display relative parameter information and alarm information of the electronic cigarette.

INDUSTRIAL APPLICABILITY

All the above are merely preferred embodiments of the present invention. The present invention is intended to cover all equivalent arrangements and modifications without departing from the scope of the present invention.

The invention claimed is:
1. An electronic cigarette having a power chip with automatic closed-loop control for output, comprising a vaporizer and a battery assembly which are connected with each other, wherein the vaporizer comprises a heating element for heating and vaporizing cigarette liquid, the battery assembly comprises a battery and a control circuit board, wherein the control circuit board is arranged with a control circuit, the control circuit comprises a microcontroller, and comprises a power chip with automatic closed-loop control for output, a microcontroller power supply unit, and a starting switch, which are respectively electrically connected with the microcontroller, wherein the control circuit is further arranged with a reference resistor connected with the heating element, the power chip is electrically connected with the battery, the reference resistor, and the heating element, the power chip is configured to perform automatic closed-loop control by determining a resistance value of the heating element and feedback signal for output voltage under a command of the microcontroller, to provide precisely adjustable output voltage to the heating element and enable the heating element to produce constant amount of vapor, wherein the power chip comprises a built-in MCU module, a full bridge buck-boost module, an output voltage feedback circuit module, and an enable signal terminal EN which is connected with the built-in MCU module, wherein the full bridge buck-boost module is connected with a signal terminal VOUT for providing output voltage to the heating element, the output voltage feedback circuit module is configured to feed output voltage of the signal terminal VOUT back to the built-in MCU module, the built-in MCU module comprises a PID controller configured to perform proportional control, integral control, and differential control for the full bridge buck-boost module, to provide precisely adjustable output voltage, and the enable signal terminal EN is configured to input an activation signal to activate the built-in MCU module, and before being acti- vated, the built-in MCU module is in a sleep state in which the output voltage of the signal terminal VOUT is zero.

2. The electronic cigarette having a power chip with automatic closed-loop control for output according to claim 1, wherein the power chip comprises an internal power module, an operational amplifying unit module, and a plurality of signal terminals, wherein the full bridge buck-boost module comprises four N-channel MOS transistors and four PWM driving logic circuits, the built-in MCU module is connected with and configured to control the four PWM driving logic circuits, and the four PWM driving logic circuits are respectively connected with and configured to control the four N-channel MOS transistors, wherein a first PWM driving logic circuit is further connected with a signal terminal BOOT1 and a signal terminal SW1, and a fourth PWM driving logic circuit is further connected with a signal terminal BOOT2 and a signal terminal SW2, a first N-channel MOS transistor is electrically connected with a second N-channel MOS transistor, a fourth N-channel MOS transistor is electrically connected with a third N-channel MOS transistor, the first N-channel MOS transistor is further connected with an external input voltage terminal, i.e., a signal terminal VIN, and the fourth N-channel MOS transistor is further connected with a signal terminal VOUT, wherein a second PWM driving logic circuit, the second N-channel MOS transistor, the third N-channel MOS transistor and a third PWM driving logic circuit are respectively arranged with a port connected with a grounding terminal PGND, wherein the internal power module is configured to step up input voltage of the signal terminal VIN and then supply power to the four PWM driving logic circuits, the operational amplifying unit module is configured to detect a resistance value of the heating element, generate a differential analog signal by amplification operation and send the differential analog signal to the built-in MCU module, the built-in MCU module is configured to generate a resistance signal by operations and send the resistance signal to the microcontroller, and the built-in MCU module is configured to perform operations with a high degree of accuracy based on a setting signal of the microcontroller and a feedback signal of the output voltage feedback circuit module, and automatically control the full bridge buck-boost module, to provide precisely adjustable output voltage through the signal terminal VOUT.

3. The electronic cigarette having a power chip with automatic closed-loop control for output according to claim 2, wherein the power chip further comprises a power supply signal terminal VDD, a grounding signal terminal GND, a data communication signal terminal SDA, and a communication clock signal terminal SCL, which are connected with the built-in MCU module, wherein the data communication signal terminal SDA serves for interactive data communication between the microcontroller MCU and the built-in MCU module, setting signals of the microcontroller which comprise a signal of a setting value of output voltage are sent to the built-in MCU module through the data communication signal terminal SDA and the communication clock signal terminal SCL.

4. The electronic cigarette having a power chip with automatic closed-loop control for output according to claim 3, wherein the signal of the setting value of the output voltage is generated by means of the microcontroller by a calculation based on the resistance signal.

5. The electronic cigarette having a power chip with automatic closed-loop control for output according to claim 2, wherein the built-in MCU module comprises an AD analog-to-digital conversion unit configured to convert an analog signal into a digital signal to achieve high precision control, and bits of the AD analog-to-digital conversion unit are greater than 12.

6. The electronic cigarette having a power chip with automatic closed-loop control for output according to claim 2, wherein the power chip further comprises a signal terminal IN+ and a signal terminal IN− which are connected with the operational amplifying unit module, wherein the signal terminal IN+ is connected with the signal terminal VOUT, the signal terminal IN− is connected with an end of the heating element, and a resistor is connected in series between the signal terminal IN+ and the signal terminal IN−.

7. The electronic cigarette having a power chip with automatic closed-loop control for output according to claim 2, wherein an inductor is connected in series between the signal terminal SW1 and the signal terminal SW2, a first capacitor is connected in series between the signal terminal SW1 and the signal terminal BOOT1, and a second capacitor is connected in series between the signal terminal SW2 and the signal terminal BOOT2.

8. The electronic cigarette having a power chip with automatic closed-loop control for output according to claim 2, wherein the signal terminal VIN has an input voltage in a range of 2.5V-12V, and the signal terminal VOUT has an output voltage in a range of 0V-18V.

9. The electronic cigarette having a power chip with automatic closed-loop control for output according to claim 2, wherein the power chip further comprises an internal circuit protection module electrically connected with the built-in MCU module, to provide overvoltage protection, under-voltage protection, overcurrent protection, and over-temperature protection, for internal circuits of the chip.

10. The electronic cigarette having a power chip with automatic closed-loop control for output according to claim 1, wherein the control circuit further comprises an energy calculating unit and an energy and vaporizing amount conversion unit which are connected with the microcontroller MCU, and comprise an air flow sensor for detecting air flow, wherein the energy calculating unit comprises a power calculating unit and a timer for counting a time period in which the air flow sensor works, and the energy and vaporizing amount conversion unit is configured to convert an energy calculated by the energy calculating unit into a vapor amount or a consumption amount of cigarette liquid.

11. The electronic cigarette having a power chip with automatic closed-loop control for output according to claim 10, wherein the control circuit is arranged with an alarm unit for warning users, and the microcontroller is preset with a limit value of the vapor amount or the consumption amount of the cigarette liquid, the microcontroller is configured to control the power chip to stop output voltage, or control the alarm unit to send a warning signal, or control the power chip to stop output voltage and meanwhile control the alarm unit to send a warning signal, when the vapor amount or the consumption amount of the cigarette liquid calculated by the energy and vaporizing amount conversion unit exceeds the limit value.

12. The electronic cigarette having a power chip with automatic closed-loop control for output according to claim 11, wherein the timer is configured to perform timing including a timing of single puff and a total timing of a certain time, the limit value includes a limit value of single puff and a limit value in a certain time, the microcontroller is configured to control the power chip to stop output voltage, or control the alarm unit to send a warning signal, or control the power chip to stop output voltage and meanwhile control the alarm unit to send a warning signal, when the vapor amount or the consumption amount of the cigarette liquid calculated by the energy and vaporizing amount conversion unit exceeds the limit value of single puff or the limit value in a certain time.

13. The electronic cigarette having a power chip with automatic closed-loop control for output according to claim 11, wherein the alarm unit comprises an audible alarm, an LED light alarm, or a vibration alarm.

14. The electronic cigarette having a power chip with automatic closed-loop control for output according to claim 1, wherein the control circuit further comprises a battery detection unit, a battery charging unit, and a battery protection unit, which are respectively electrically connected with the battery.

15. The electronic cigarette having a power chip with automatic closed-loop control for output according to claim 1, wherein the control circuit further comprises a display unit arranged on a surface of the electronic cigarette, to display relative parameter information and alarm information of the electronic cigarette.

\* \* \* \* \*